US008619860B2

(12) United States Patent
Chen et al.

(10) Patent No.: US 8,619,860 B2
(45) Date of Patent: Dec. 31, 2013

(54) SYSTEM AND METHOD FOR SCALABLE ENCODING AND DECODING OF MULTIMEDIA DATA USING MULTIPLE LAYERS

(75) Inventors: Peisong Chen, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1182 days.

(21) Appl. No.: 11/416,851

(22) Filed: May 2, 2006

(65) Prior Publication Data

US 2006/0262985 A1     Nov. 23, 2006

Related U.S. Application Data

(60) Provisional application No. 60/677,607, filed on May 3, 2005, provisional application No. 60/677,609, filed on May 3, 2005, provisional application No. 60/677,610, filed on May 3, 2005, provisional application No. 60/677,611, filed on May 3, 2005, provisional application No. 60/789,271, filed on Apr. 4, 2006.

(51) Int. Cl.
*H04N 7/12*     (2006.01)
*H04N 11/02*     (2006.01)
*H04N 11/04*     (2006.01)

(52) U.S. Cl.
USPC .................................................... 375/240.16

(58) Field of Classification Search
USPC .................................................... 375/240.16
See application file for complete search history.

(56) References Cited

U.S. PATENT DOCUMENTS

| 6,414,991 B1 * | 7/2002 | Yagasaki et al. ......... 375/240.12 |
| 6,480,547 B1 | 11/2002 | Chen et al. |
| 6,674,376 B1 * | 1/2004 | Nishimura .................... 341/67 |
| 6,707,949 B2 | 3/2004 | Haskell et al. |
| 6,731,811 B1 | 5/2004 | Rose |
| 6,788,740 B1 | 9/2004 | Van Der Schaar et al. |

(Continued)

FOREIGN PATENT DOCUMENTS

| JP | 04177992 | 6/1992 |
| JP | 09182084 | 7/1997 |

(Continued)

OTHER PUBLICATIONS

ITU-T H.261 (Mar. 1993), Line Transmission of Non-telephone Signals, Video Codec for Audiovisual Services at p x 64 kbits.

(Continued)

*Primary Examiner* — Mehrdad Dastouri
*Assistant Examiner* — Jeremaiah C Hallenbeck-Huber
(74) *Attorney, Agent, or Firm* — Dang Vo; Brent Boyd

(57) ABSTRACT

A method of processing multimedia data being associated with multiple layers is disclosed. The method may include determining a base layer residual and performing interlayer prediction to generate an enhancement layer residual if at least one of a number of non-zero coefficients of the base layer residual or a number of zero coefficients of the base layer residual meets a first selected condition. A method of decoding a multimedia bitstream may include receiving a multimedia bitstream having a base layer and an enhancement layer and decoding the base layer to determine whether the enhancement layer should be decoded using intralayer prediction or interlayer prediction.

35 Claims, 8 Drawing Sheets

(56) References Cited

U.S. PATENT DOCUMENTS

| | | | |
|---|---|---|---|
| 6,985,526 B2 | 1/2006 | Bottreau et al. | |
| 7,317,759 B1* | 1/2008 | Turaga et al. | 375/240.01 |
| 7,406,176 B2 | 7/2008 | Zhu et al. | |
| 2002/0122486 A1* | 9/2002 | Yagasaki et al. | 375/240.11 |
| 2004/0223653 A1 | 11/2004 | Rose | |
| 2004/0252901 A1* | 12/2004 | Klein Gunnewiek et al. | 382/240 |
| 2006/0008009 A1* | 1/2006 | Bao et al. | 375/240.24 |
| 2006/0233254 A1* | 10/2006 | Lee et al. | 375/240.16 |
| 2012/0219060 A1 | 8/2012 | Chen et al. | |

FOREIGN PATENT DOCUMENTS

| | | |
|---|---|---|
| JP | 2005167431 | 6/2005 |
| JP | 2006304307 | 2/2006 |
| KR | 1020060059772 | 6/2006 |
| KR | 1020060101847 | 9/2006 |
| KR | 1020060105407 | 10/2006 |
| KR | 1020060122664 | 11/2006 |
| RU | 2224302 | 2/2004 |
| WO | WO0005898 | 2/2000 |
| WO | 0033583 A1 | 6/2000 |
| WO | WO0103442 | 1/2001 |
| WO | 0162010 A1 | 8/2001 |

OTHER PUBLICATIONS

ITU-T H.262 (Feb. 2000), Series H: Audiovisual and Multimedia Systems, Infrastructure of audiovisual services—Coding of moving video; Information technology—Generic coding of moving pictures and associated audio information: Video.

ITU-T H.263 (Jan. 2005), Series H: Audiovisual and Multimedia Systems, Infrastructure of audiovisual services—Coding of moving video; Video coding for low bit rate communication.

ITU-T H.264 (Mar. 2005), Series H: Audiovisual and Multimedia Systems, Infrastructure of audiovisual services—Coding of moving video; Advanced video coding for generic audiovisual services.

IntimationatSearch'Report—PCT/US06/017179, International Search Authority—US, Sep. 9, 2008.

Written Opinion—PCT/US06/017179, International Search Authority—US, Sep. 9, 2008.

Richardsons "H.264 and MPEG-4 Video Compression: Video Coding for Next-generation Multimedia" John Wiley & Sons, 2003, pp. 228-231, 235, 240-243.

Taiwanese Search Report—095115759—TIPO—Oct. 6, 2009.

Woo-Jin Han et al. "symbol prediction techniques for SVC." Joint Video Team (JVT) of ISO/IEC MPEG&ITU-T VCEG 15Th meeting [JVT-0063]. Busan, Apr. 2005: 1-9.

"Joint Scalable Video Model JSVM-2." Joint Video Team (JVT) of ISO/IEC MPEG&ITU-T VCEG 15Th meeting [JVT-O202]. Busan, Apr. 2005: 1-31.

Woong II Choi et al. "CE 3. Improve coding efficiency of entropy coding." Joint Video Team (JVT) of ISO/IEC MPEG&ITU-T VCEG 15th meeting [JVT-O303]. Busan, Apr. 2005: 1-5.

Karczewicz et al., "Extension to AVC-based scalable video", 12. JVT Meeting; 69. MPEG Meeting; Jul. 17, 2004-Jul. 23, 2004; Redmond. US; (Joint Video Team of ISO/IECJTC1/SC29/VVG11 and ITU-T SG.16), No. JVT-L037r1-L, Jul. 23, 2004, XP030005891, ISSN: 0000-0420.

Schwarz H., et al., "SNR-scalable extension of H.264/AVC", Image Processing, 2004. ICIP '04. 2004 International Conference on Singapore Oct. 24-27, 2004, Piscataway, NJ, USA, IEEE, vol. 5, Oct. 24, 2004, pp. 3113-3116, XP010786456, DOI: 10.1109/ICIP.2004. 1421772 ISBN: 978-0-7803-8554-2.

Schwarz H., et al., "SVC Core Experiment 2.1: Inter-layer prediction of motion and residual data", ISO/IEC JTC1/SC29/WG11 M11043, XX, XX, No. M11043, Jul. 23, 2004, pp. 1-6, XP002360488.

Supplementary European Search Report—EP06752235—Search Authority—Munich—Nov. 27, 2012.

* cited by examiner

SYSTEM AND METHOD FOR SCALABLE ENCODING AND DECODING OF MULTIMEDIA DATA USING MULTIPLE LAYERS

CLAIM OF PRIORITY UNDER 35 U.S.C. §119

The present Application for Patent claims priority to Provisional Application No. 60/789,271 entitled "DATA PROCESSING WITH SCALABILITY," filed Apr. 4, 2006, Provisional Application No. 60/677,607 entitled "BASE LAYER VIDEO QUALITY COMPARISON," filed May 3, 2005, Provisional Application No. 60/677,609 entitled "INTRODUCING NEW MB MODES," filed May 3, 2005, Provisional Application No. 60/677,610 entitled "SHARING INFORMATION IN TWO LAYER CODING," filed May 3, 2005, and Provisional Application No. 60/677,611 entitled "INTERLAYER PREDICTION FOR INTER MBS IN SCALABLE VIDEO CODING," filed May 3, 2005, and all assigned to the assignee hereof and hereby expressly incorporated by reference herein.

BACKGROUND

1. Field

The invention relates to scalable encoding and decoding of multimedia data that may comprise audio data, video data or both. More particularly, the invention relates to a system and method for scalable encoding and decoding of multimedia data using multiple layers.

2. Background

The International Telecommunication Union (ITU) has promulgated the H.261, H.262, H.263 and H.264 standards for digital video encoding. These standards specify the syntax of encoded digital video data and how this data is to be decoded for presentation or playback. However, these standards permit various different techniques (e.g., algorithms or compression tools) to be used in a flexible manner for transforming the digital video data from an uncompressed format to a compressed or encoded format. Hence, many different digital video data encoders are currently available. These digital video encoders are capable of achieving varying degrees of compression at varying cost and quality levels.

Scalable video coding generates multiple layers, for example a base layer and an enhancement layer, for the encoding of video data. These two layers are generally transmitted on different channels with different transmission characteristics resulting in different packet error rates. The base layer typically has a lower packet error rate when compared with the enhancement layer. The base layer generally contains the most valuable information and the enhancement layer generally offers refinements over the base layer. Most scalable video compression technologies exploit the fact that the human visual system is more forgiving of noise (due to compression) in high frequency regions of the image than the flatter, low frequency regions. Hence, the base layer predominantly contains low frequency information and the enhancement layer predominantly contains high frequency information. When network bandwidth falls short, there is a higher probability of receiving just the base layer of the coded video (no enhancement layer). In such situations, the reconstructed video is blurred and deblocking filters may even accentuate this effect.

Decoders generally decode the base layer or the base layer and the enhancement layer. When decoding the base layer and the enhancement layer, multiple layer decoders generally need increased computational complexity and memory when compared with single layer decoders. Many mobile devices do not utilize multiple layer decoders due to the increased computational complexity and memory requirements.

SUMMARY

A method of processing multimedia data being associated with multiple layers may include determining a base layer residual. Interlayer prediction may be performed to generate an enhancement layer residual if at least one of a number of non-zero coefficients of the base layer residual or a number of zero coefficients of the base layer residual meets a first selected condition. The first selected condition may be the number of non-zero or zero coefficients of the base layer residual being greater than, less than or equal to a threshold. Temporal prediction may be performed to generate the enhancement layer residual if at least one of a number of non-zero coefficients of the base layer residual or a number of zero coefficients of the base layer residual meets a second selected condition. The second selected condition may be the number of non-zero or zero coefficients of the base layer residual being greater than, less than or equal to a threshold.

A method of using a base layer to predict an enhancement layer is disclosed. A block of multimedia data may be used to generate a base residual that includes a plurality of base quantized coefficients. The block of multimedia data may also be used to generate an enhancement residual that includes a plurality of enhancement quantized coefficients. A first value may be determined based on the plurality of base quantized coefficients and a second value may be determined based on the plurality of enhancement quantized coefficients. The enhancement layer may be determined by using at least one of the plurality of base quantized coefficients or the plurality of enhancement quantized coefficients.

A method of decoding a multimedia bitstream may include receiving a multimedia bitstream having a base layer and an enhancement layer. The base layer may be decoded to determine whether the enhancement layer should be decoded using intralayer prediction or interlayer prediction.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements. In addition, the first digit of each reference number indicates the figure in which the element first appears.

Figure 1:
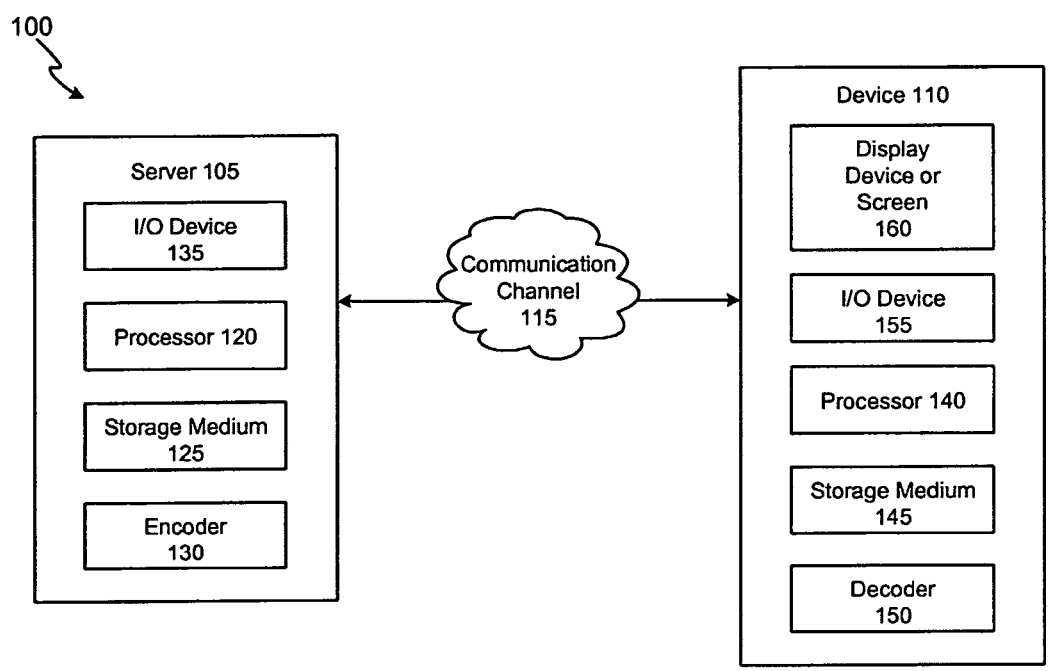
FIG. 1 is a block diagram of a system for encoding and decoding multimedia data.

FIG. 1 is a block diagram of a system 100 for encoding and decoding multimedia (e.g., video, audio or both) data. System 100 may be configured to encode (e.g., compress) and decode (e.g., decompress) video data (e.g., pictures and video frames). System 100 may include a server 105, a device 110, and a communication channel 115 connecting server 105 to device 110. System 100 may be used to illustrate the methods described below for encoding and decoding video data. System 100 may be implemented by hardware, software, firmware, middleware, microcode, or any combination thereof. One or more elements can be rearranged and/or combined, and other systems can be used in place of system 100 while still maintaining the spirit and scope of the invention. Additional elements may be added to system 100' or may be removed from system 100 while still maintaining the spirit and scope of the invention.

Server 105 may include a processor 120, a storage medium 125, an encoder 130, and an I/O device 135 (e.g., a transceiver). Processor 120 and/or encoder 130 may be configured to receive video data in the form of a series of video frames. Processor 120 and/or encoder 130 may be an Advanced RISC Machine (ARM), a controller, a digital signal processor (DSP), a microprocessor, or any other device capable of processing data. Processor 120 and/or encoder 130 may transmit the series of video frames to storage medium 125 for storage and/or may encode the series of video frames. Storage medium 125 may also store computer instructions that are used by processor 120 and/or encoder 130 to control the operations and functions of server 105. Storage medium 125 may represent one or more devices for storing the video data and/or other machine readable mediums for storing information. The term "machine readable medium" includes, but is not limited to, random access memory (RAM), flash memory, (read-only memory) ROM, EPROM, EEPROM, registers, hard disk, removable disk, CD-ROM, DVD, wireless channels, and various other mediums capable of storing, containing or carrying instruction(s) and/or data.

Encoder 130, using computer instructions received from storage medium 125, may be configured to perform both parallel and serial processing (e.g., compression) of the series of video frames. The computer instructions may be implemented as described in the methods below. Once the series of frames are encoded, the encoded data may be sent to I/O device 135 for transmission to device 110 via communication channel 115.

Device 110 may include a processor 140, a storage medium 145, a decoder 150, an I/O device 155 (e.g., a transceiver), and a display device or screen 160. Device 110 may be a computer, a digital video recorder, a handheld device (e.g., a cell phone, Blackberry, etc.), a set top box, a television, and other devices capable of receiving, processing (e.g., decompressing) and/or displaying a series of video frames. I/O device 155 receives the encoded data and sends the encoded data to the storage medium 145 and/or to decoder 150 for decompression. Decoder 150 is configured to reproduce the the series of video frames using the encoded data. Once decoded, the series of video frames can be stored in storage medium 145. Decoder 150, using computer instructions retrieved from storage medium 145, may be configured to perform both parallel and serial processing (e.g., decompression) of the encoded data to reproduce the series of video frames. The computer instructions may be implemented as described in the methods below. Processor 140 may be configured to receive the series of video frames from storage medium 145 and/or decoder 150 and to display the series of video frames on display device 160. Storage medium 145 may also store computer instructions that are used by processor 140 and/or decoder 150 to control the operations and functions of device 110.

Communication channel 115 may be used to transmit the encoded data between server 105 and device 110. Communication channel 115 may be a wired connection or network and/or a wireless connection or network. For example, communication channel 115 can include the Internet, coaxial cables, fiber optic lines, satellite links, terrestrial links, wireless links, other media capable of propagating signals, and any combination thereof.

Figure 2:
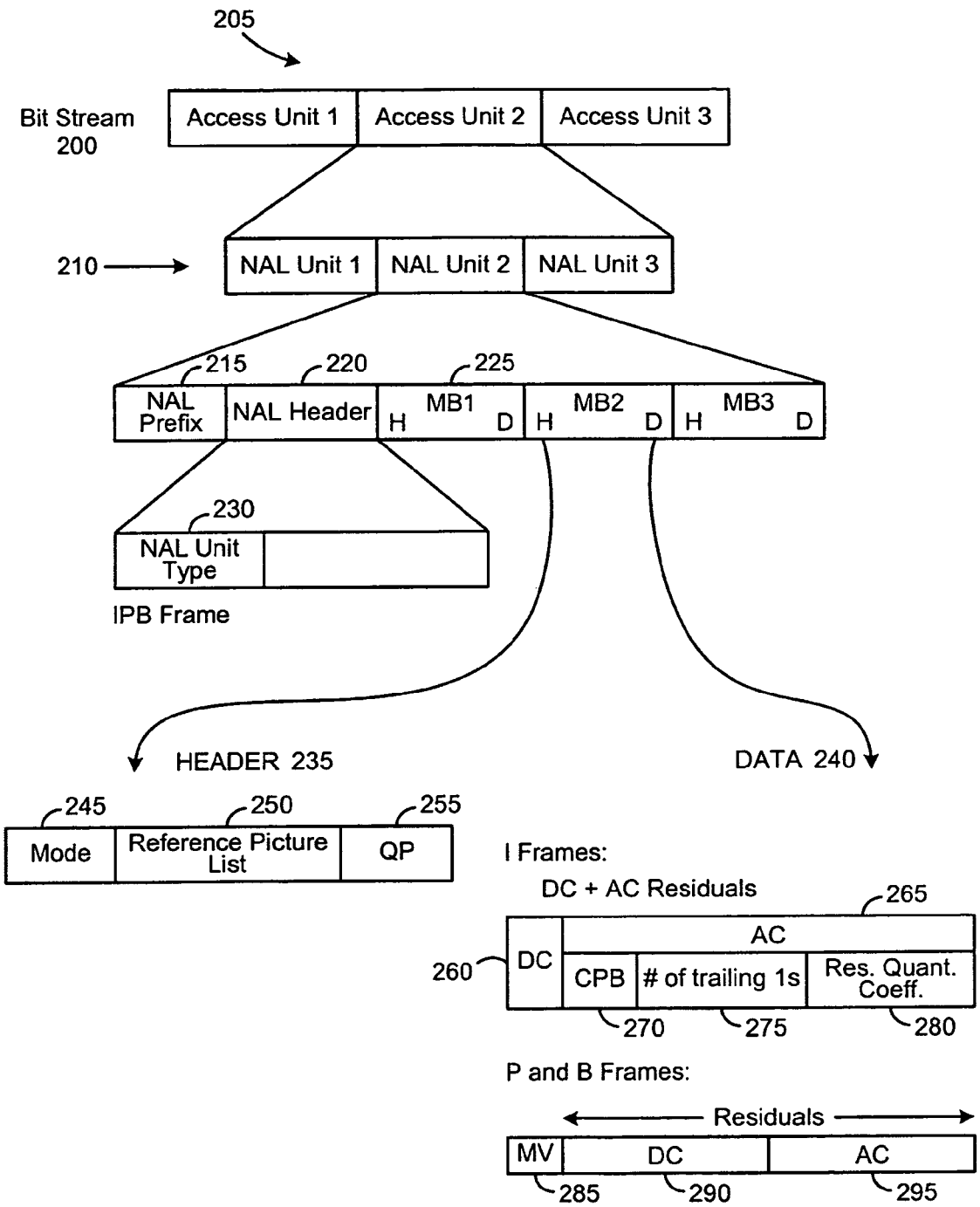
FIG. 2 is a block diagram of a H.264 video data bitstream.

FIG. 2 is a block diagram of a H.264 video data bitstream 200. The bitstream 200 may be organized or partitioned into a number of access units 205 (e.g., access unit 1, access unit 2, access unit 3, etc.). Each access unit 205 may include information corresponding to a coded video frame. Each access unit 205 may be organized or partitioned into a number of NAL units 210. Each NAL unit 210 may include a NAL prefix 215, a NAL header 220, and a block of data 225. NAL prefix 215 may be a series of bits (e.g., 00000001) indicating the beginning of the block of data 225 and NAL header 220 may include a NAL unit type 230 (e.g., an I, P or B frame). The block of data 225 may include a header 235 and data 240. The block of data 225 may be organized or partitioned into a 16×16 macroblock of data, an entire frame of data or a portion of the video data (e.g., a 2×2 block or a 4×4 block). The terms "macroblock" and "block" may be used interchangeably.

Header 135 may include a mode 245, a reference picture list 250 and QP values 255. Mode 245 may indicate to encoder 130 how to organize or partition the macroblocks, how to determine and transmit motion information and how to determine and transmit residual information. Data 240 may include motion information (e.g., a motion vector 285) and residual information (e.g., DC 260 and AC 265 residuals). For I frames, data 240 may include DC residuals 260 and AC residuals 265. AC residuals 265 may include Coded Block Pattern (CBP) values 270, number of trailing ones 275 and residual quantization coefficients 280. No motion information may be needed for an I frame because it is the first frame. For P and B frames, data 240 may include motion vectors 285, DC residuals 290 and AC residuals 295.

Figure 3:
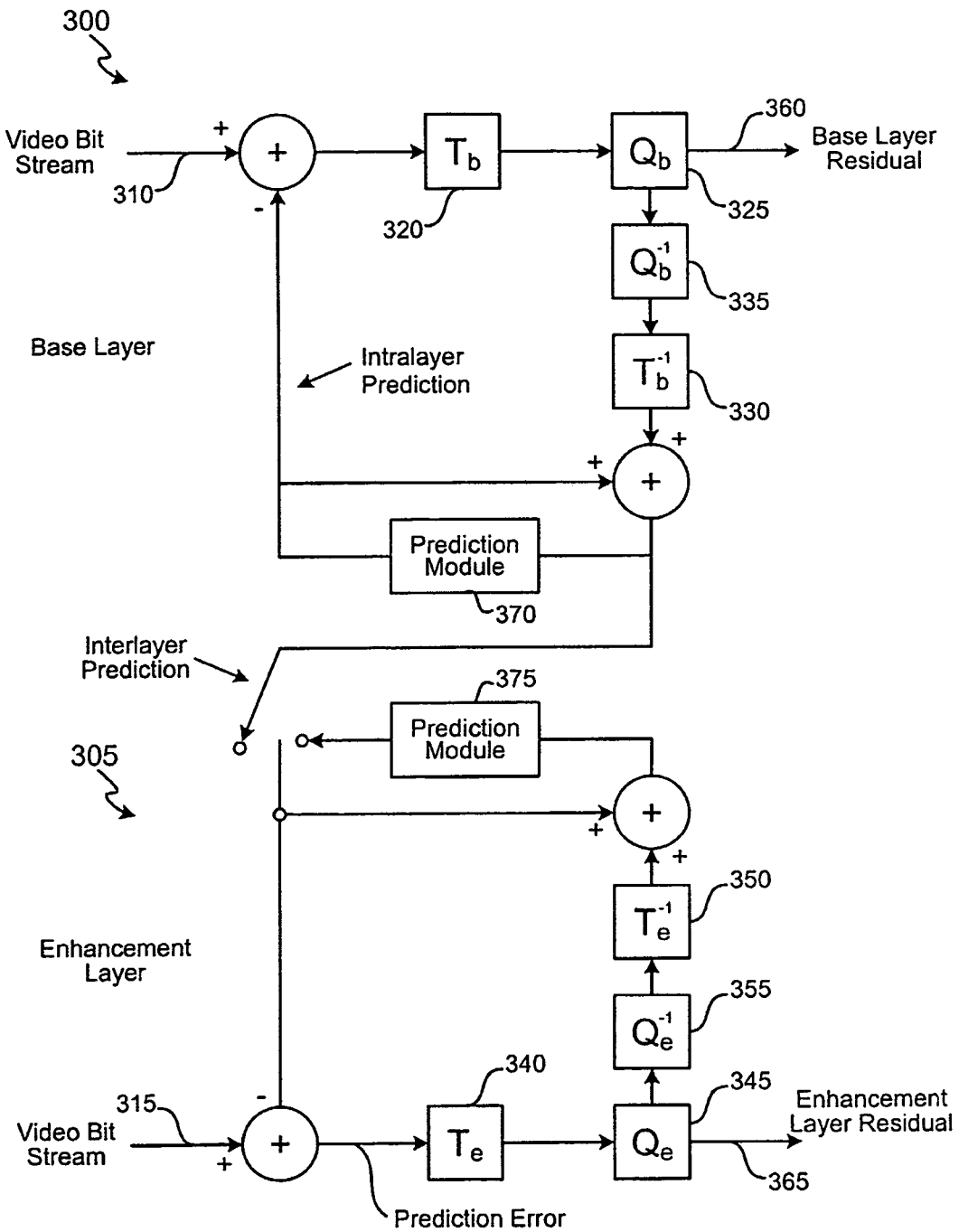
FIG. 3 is a block diagram of a multiple layer scalable encoder with interlayer prediction.

FIG. 3 is a block diagram of base and enhancement layer encoding modules 300 and 305 of multiple layer scalable encoder 130. Multiple layer encoding introduces multiple temporal prediction loops. For example, two layer coding may introduce two temporal prediction loops. Video data may be shared between the two layers to allow for a certain bit assignment for the two layers and to reduce overhead. Interlayer prediction may be used at the enhancement layer to reduce total coding overhead. Base layer encoding module 300 may be used for the base layer video and enhancement layer encoding module 305 may be used for the enhancement layer video. In some embodiments, the base layer video may be the same or approximately the same as the enhancement layer video. Video data may be encoded prior to receipt by base and enhancement layer encoding modules 300 and 305.

Encoded video data may be provided at inputs 310 and 315. The base layer encoding module 300 may include a transform ($T_b$) module 320, a quantization ($Q_b$) module 325, an inverse transform ($T_b^{-1}$) module 330, and an inverse quantization ($Q_b^{-1}$) module 335. The enhancement layer encoding module 305 may include a transform ($T_e$) module 340, a quantization ($Q_e$) module 345, an inverse transform ($T_e^{-1}$) module 350, and an inverse quantization ($Q_e^{-1}$) module 355. Quantization modules 325, 335, 345 and 355 may include one or more quantization parameters that may be used to determine the quality of the resulting image. Generally, the quantization parameters for the base layer encoding module 300 are larger than the quantization parameters for the enhancement layer encoding module 305. A larger quantization parameter indicated a lower quality image. Base layer encoding module 300 may produce residual information 360 for the base layer and enhancement layer encoding module 305 may produce residual information 365 for the enhancement layer. Base and enhancement layer encoding modules 300 and 305 may also include prediction modules 370 and 375, respectively. Prediction modules 370 and 375 may be combined into a single prediction module. Prediction modules 370 and 375 may be used to perform intralayer and interlayer encoding of the multimedia data.

For I frame, the decoded base layer may be used as a reference for the enhancement layer. For P and B frames, a collocated base frame and a reference, computed by motion compensating one or more previous frames, may be used for the enhancement layer. Interlayer prediction can be performed on a macroblock basis, a block basis (e.g., a 4×4 block basis), or a dct coefficient basis.

For each macroblock in a P or B frame, interlayer prediction or intralayer prediction (e.g., temporal prediction) can be used depending on various factors such as the rate-distortion cost. If interlayer prediction is used, an enhancement layer macroblock may be predicted by using a collocated base layer macroblock. In some embodiments, the prediction error may be encoded and then transmitted to decoder 150. If temporal prediction is used, an enhancement layer macroblock may be predicted by using one or more macroblocks from one or more prior and/or subsequent frames as a reference and using (e.g., copying) macroblock mode information and motion vectors from the base layer.

Figure 4:
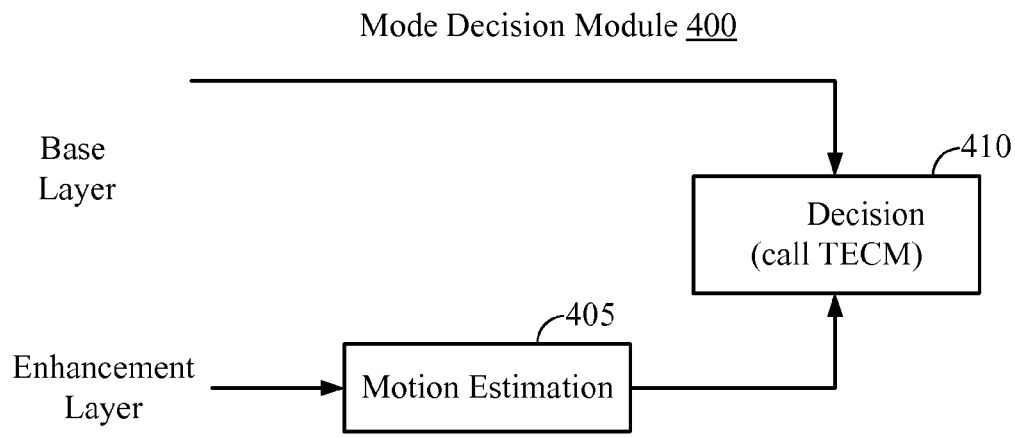
FIG. 4 is a flow chart of a Mode Decision Module (MDM), which may be part of the prediction modules of FIG. 3.

FIG. 4 is a flow chart of a Mode Decision Module (MDM) 400, which may be part of prediction modules 370 and 375 of FIG. 3. MDM 400 may include a motion estimation module 405 and a decision module 410. MDM 400 may be implemented by processor 120 and/or encoder 130. Motion estimation module 405 generates motion information (e.g., motion vectors) for the enhancement layer for the various modes. The mode may be determined by using information (e.g., motion vectors and residuals) from the base layer and the enhancement layer. Several modes exist in H.264 motion estimation. For example, mode "a" may be a 16×16 macroblock (output $MV_x$ and $MV_y$), mode "b" may be two 8×16 blocks or two 16×8 blocks (for each partition output $MV_x$ and $MV_y$), and mode "c" may be four 8×8 blocks (for each partition output 8×8 sub-partition mode and for each sub-partition output $MV_x$ and $MV_y$). Each macroblock and each block may have its own motion information. For two layer coding, several modes allow a large amount of flexibility in bit assignment. In some modes, the enhancement layer generates more accurate motion vectors when compared with the base layer because of the higher quality enhancement layer video. In two layer coding, the base layer and the enhancement layer may both use the same motion information corresponding to the base layer. Residual information may be generated by using a predicted macroblock and subtracting it from a current macroblock.

Encoder 130 may select a skip mode, which is an intralayer prediction mode. In the skip mode, encoder 130 does not transmit any motion and residual information about the current macroblock or block to decoder 150. Motion information for the current block may be derived from one or more neighboring blocks. In one mode, encoder 130 may transmit motion information and may not transmit residual information. This may be accomplished by setting coded_block_pattern to 0. In the H.264 standard, when the coded_block_pattern is set to 0, all transform coefficients are 0. When coded_block_pattern=0, decoder 150 is notified that no residual information is being sent by encoder 130. To encode the coded_block_pattern value, a code number as shown in Table I may be assigned to the coded_block_pattern. The code number may be coded using an Exp-Golomb code. Decoder 150 may receive a code number as shown in Table I from encoder 130.

TABLE I

| Code Number | Coded_Block_Pattern | Bit String |
|---|---|---|
| 0 | 0 | 1 |
| 1 | 16 | 010 |
| 2 | 1 | 011 |
| 3 | 2 | 00100 |
| 4 | 4 | 00101 |
| 5 | 8 | 00110 |
| ... | ... | ... |

Decision module 410 may select a mode, which influences various factors such as bit cost of encoding motion information, coding efficiency, motion accuracy, overhead, performance, rate-distortion optimization, etc. One mode may produce better results for the base layer while another mode may produce better results for the enhancement layer. Therefore, some compromising may need to occur to achieve the "best mode" or "optimal mode" for both the base layer and the enhancement layer. No compromising may be needed if the same mode produces the best results for both the base layer and the enhancement layer. The best mode may be chosen based on, for example, rate distortion optimization because it represents the best tradeoff between motion accuracy and bit cost of encoding motion information. Decision module 410 may utilize TECM 500 (see FIG. 5) for optimization purposes. The mode may provide processor 120 and/or encoder 130 with a set of guidelines, functions, instructions, parameters, routines, or any combination thereof, to perform the encoding of the video data.

The description below provides an example of three different modes, a, b and c. Assume the base layer has the best performance at mode a, and the enhancement layer has the best performance at mode b. If decision module 410 selects mode a, then $\Delta R_{a\_enh}$ overhead is introduced at the enhancement layer and no overhead is introduced at the base layer. If decision module 410 selects mode b, then $\Delta R_{b\_base}$ overhead is introduced at the base layer and no overhead is introduced at the enhancement layer. If decision module 410 selects mode c, then $\Delta R_{c\_base}$ overhead is introduced at the base layer and $\Delta R_{c\_enh}$ overhead is introduced at the enhancement layer. From these variables, the cost of overhead for each mode for each layer can be determined.

The total cost for both layers can be determined as follows. Criteria 1: If the total cost is defined as $C=\Delta R_{x\_base}$, where x can be a, b or c, then the base layer has the highest coding efficiency and the results of the enhancement layer are immaterial. Criteria 2: If the total cost is defined as $C=\Delta R_{x\_enh}$, where x can be a, b or c, then the enhancement layer has the highest coding efficiency and the results of the base layer are immaterial. Criteria 3: If the total cost is defined as $C=\Delta R_{b\_base}/2+\Delta R_{x\_enh}/2$, where x can be a, b or c, then both the base layer and the enhancement layer are treated equally or similarly. Criteria 4: If the total overhead for the entire base layer frame should be no more than 5%, then the defined requirement on a macroblock basis can be determined. For example, when a macroblock j at the base layer is encoded, the upper bound of the overhead allowed can be calculated as upper bound=$(B_{j-1}-E_{j-1}+b_j)*5\%-E_{j-1}$, where $B_{j-1}$ is the total number of bits used to encode pervious j-1 macroblocks, $E_{j-1}$ is the overhead bits in $B_{j-1}$, and $b_j$ is the used bits when encoding macroblock j at its best mode at the base layer. After encoding macroblock j, $B_j$ and $E_j$ can be updated for the following macroblock.

Figure 5:
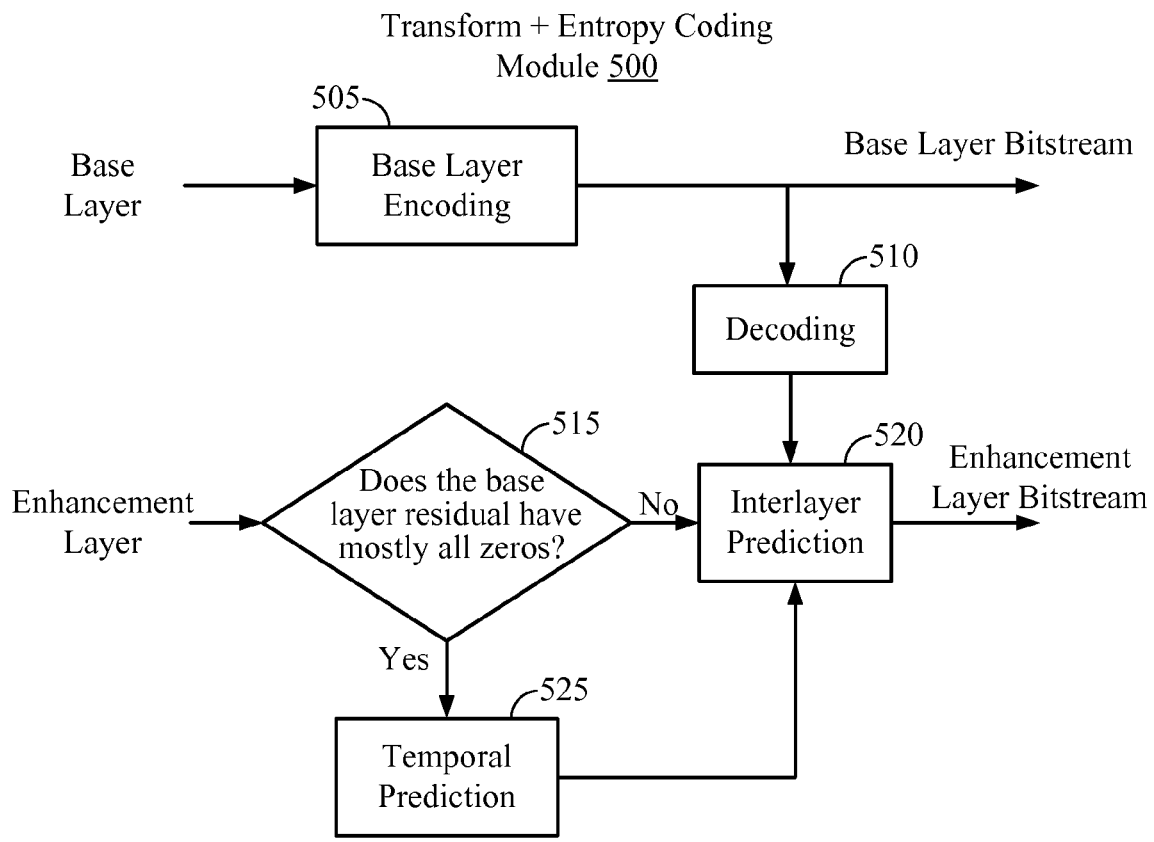
FIG. 5 is a flow chart of a Transform+Entropy Coding Module (TECM), which may be part of the prediction modules of FIG. 3.

FIG. 5 is a flow chart of a Transform+Entropy Coding Module (TECM) 500, which may be part of prediction modules 370 and 375 of FIG. 3. TECM 500 may include a base layer encoding module 505, a decoding module 510, a checking module 515, an interlayer prediction module 520, and a temporal prediction module 525. TECM 500 may be implemented by processor 120 and/or encoder 130. TECM 500 uses the encoded base layer to predict the enhancement layer. Base layer encoding module 505 may be used to determine motion information (e.g., motion vectors) for the base layer. Decoding module 510 may be used to decode the encoded base layer prior to interlayer prediction. Checking module 515 may be used to determine the number of zero and/or non-zero coefficients in the transformed base layer residual. Depending on the coefficients, interlayer prediction (520) or temporal prediction (525) may be selected to predict the enhancement layer.

Figure 6:
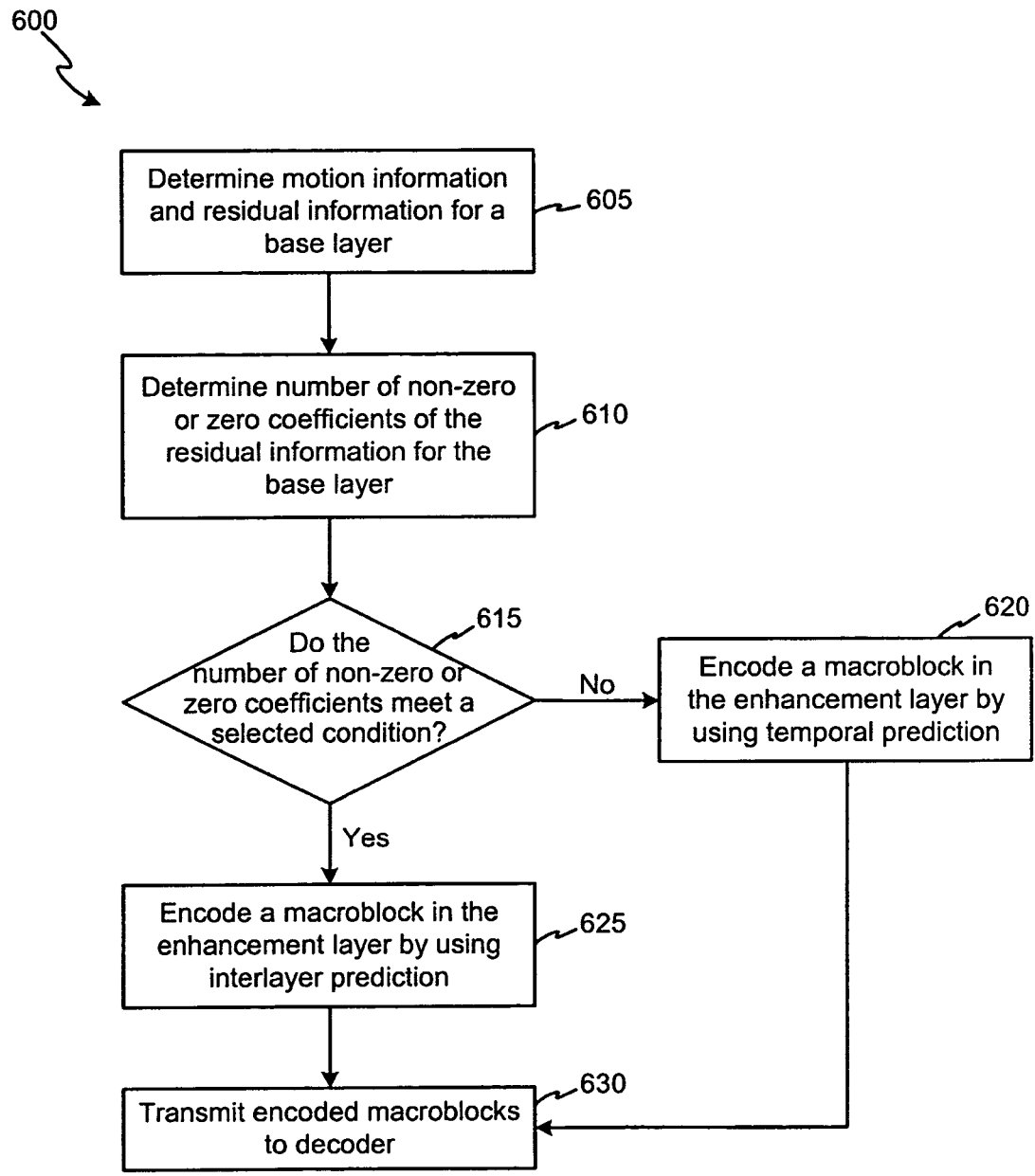
FIG. 6 is a flow chart illustrating interlayer prediction on a macroblock basis or a block basis.

FIG. 6 is a flow chart illustrating interlayer prediction on a macroblock basis or a block basis. Interlayer prediction may be performed on a macroblock basis or a block basis (i.e., any portion of the macroblock (e.g., a 4×4 block basis)). For interlayer prediction on a 4×4 block basis or a 2×2 block basis, motion information and/or residual information from the macroblocks in the base layer may be used to determine whether to use interlayer prediction or temporal prediction. Base layer encoding module 505 may determine motion information and residual information for the base layer (605). Base layer encoding module 505 may also obtain a reference (e.g., a macroblock or frame) for the enhancement layer. Base layer encoding module 505 may determine the number of non-zero or zero coefficients of the residual information for the base layer (610). If the residual information from the base layer contains more information than the reference from the enhancement layer, then the residual information in the base layer is useful to the enhancement layer. Checking module 515 may determine whether the number of non-zero or zero coefficients meet a selected condition (615). For example, checking module 515 may examine the residual information of the base layer to determine if the number of non-zero coefficients is greater than, less than or equal to a threshold (T) or the number of zero coefficients is greater than, less than or equal to a threshold (T). If the residual information includes all non-zero coefficients or some non-zero coefficients, then the residual information in the base layer may be useful to the enhancement layer and encoder 130 may use interlayer prediction to predict the macroblocks in the enhancement layer (625). If the residual information includes all zeros or some zeros, then the residual information in the base layer may not be useful to the enhancement layer and encoder 130 may use temporal prediction to predict the macroblocks in the enhancement layer (620). Encoder 130 may transmit the encoded macroblocks or encoded blocks to decoder 150 (630).

Figure 7:
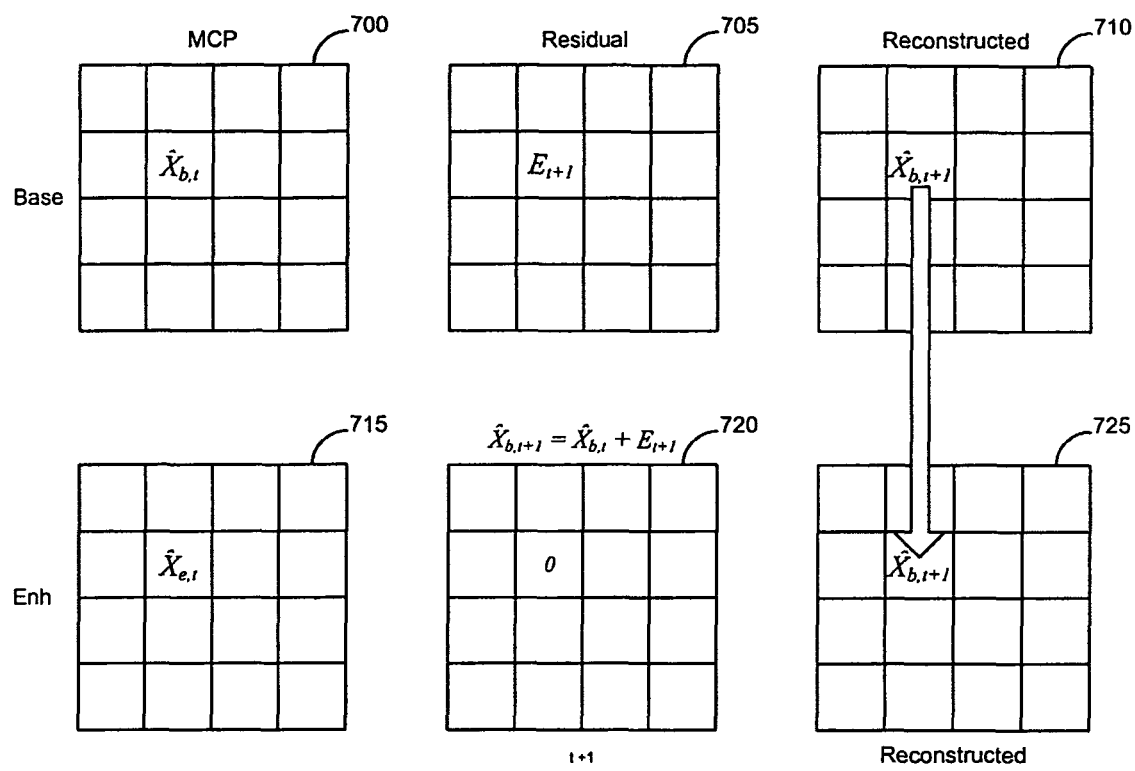
FIG. 7 shows six 4×4 blocks in the transform domain to illustrate interlayer prediction on a dct coefficient-by-coefficient basis.
Figure 8:
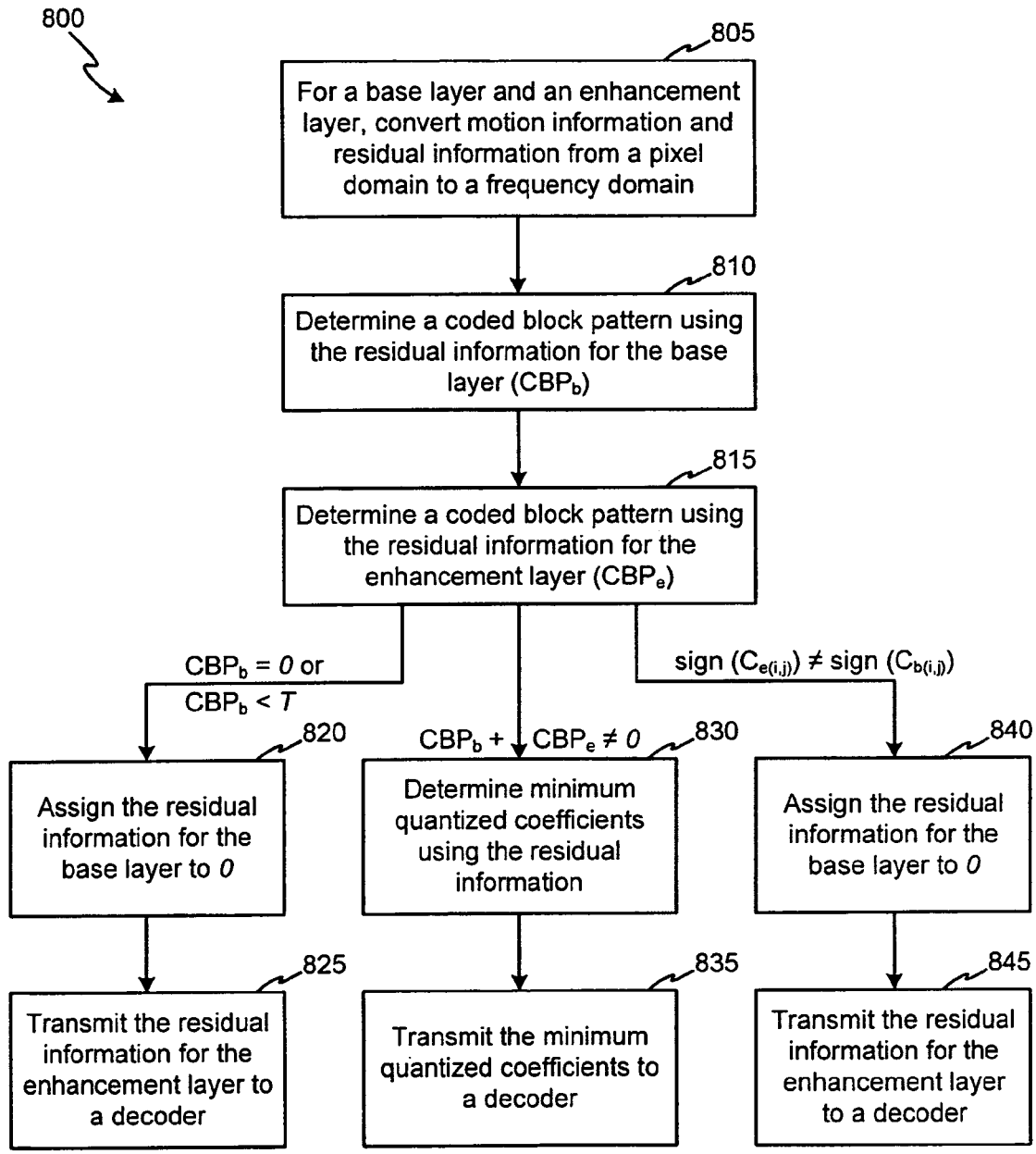
FIG. 8 illustrates a method of interlayer prediction on a dct coefficient-by-coefficient basis.

FIG. 7 shows six 4×4 blocks in the transform domain to illustrate interlayer prediction on a dct coefficient-by-coefficient basis and FIG. 8 illustrates a method 800 of interlayer prediction on a dct coefficient-by-coefficient basis. The top row includes a motion compensated prediction (MCP) or reference block 700, a residual block 705, and a reconstructed block 710 for the base layer. The bottom row includes a MCP or reference block 715, a residual block 720, and a reconstructed block 725 for the enhancement layer. MCP and residual blocks 700, 705, 715 and 720 are shown to have been converted from the spatial (e.g., pixel) domain to the transform (e.g., frequency) domain (805). MCP block 700 may be generated by using motion information in the base layer. Reconstructed block 710 may be formed by using coefficients from MCP and residual blocks 700 and 705. Reconstructed block 725 may be formed by using (e.g., copying) coefficients from reconstructed block 710.

The interlayer prediction may be performed on the non-zero coefficients in residual block 705 for the base layer. In FIG. 7, $\hat{X}_{b,t}$ represents a coefficient in MCP block 700 and $E_{t+1}$ represents an encoded non-zero coefficient in residual block 705. The reconstructed coefficient for reconstructed block 710 may be represented by $\hat{X}_{b,t+1}=\hat{X}_{b,t}+E_{t+1}$ and may be used for interlayer prediction. The reconstructed coefficient at the same position for the enhancement layer may be a copy of the reconstructed coefficient from the base layer. If $E_{t+1}=0$ or approximately 0, then the coefficient may not be useful to the enhancement layer and temporal prediction module 525 may perform temporal prediction to generate the reconstructed block 725 by using MCP block 715 and residual block 720. If $E_{t+1}\neq 0$ or approximately 0, then the coefficient may be useful to the enhancement layer and interlayer prediction module 520 may perform interlayer prediction using the coefficients. Hence, the reconstructed coefficients for the enhancement layer can be copied from the base layer. Each coefficient may also be compared to a threshold to determine whether to use interlayer prediction or temporal prediction. The coefficients for the enhancement layer may be sent from encoder 130 to decoder 150.

The term "Coded Block Pattern (CBP)" refers to the sum of all non-zero coefficients in a macroblock. Using the residual coefficients in residual macroblock 705, interlayer prediction module 520 may determine a CBP for the base layer ($CBP_b$) (810). Using the residual coefficients in residual macroblock 720, interlayer prediction module 520 may determine a CBP for the enhancement layer ($CBP_e$) (815).

If $CBP_b=0$ or $CBP_b<T$ (threshold), then interlayer prediction module 520 may assign all coefficients in residual macroblock 705 to zero (820) and may transmit residual macroblock 720 to decoder 150 (825). In some embodiments, T may be 4 (or approximately 4) where the sum of all non-zero coefficients may be determined by a linear sum or a weighed sum of the residual coefficients based on the location of the residual coefficients in the macroblock 705.

If $CBP_b+CBP_e\neq 0$, then interlayer prediction module 520 may determine minimum quantized coefficients using the residual coefficients of the base layer and the enhancement layer (830). For example, the minimum quantized coefficients may be determined using the equation $MQC(i,j)=C_e(i,j)-\min[C_b(i,j), C_e(i,j)]$, where $C_e$ may be the residual coefficients of the enhancement layer and $C_b$ may be the residual coefficients of the base layer. Interlayer prediction module 520 may transmit the MQC(i,j) to decoder 150 (835).

If the sign of $C_e(i,j) \neq$ sign of $C_b(i,j)$, then interlayer prediction module 520 may assign all residual coefficients of the base layer ($C_b(i,j)$) to zero (840) and may transmit all residual coefficients of the enhancement layer ($C_e(i,j)$) to decoder 150 (845).

Figure 9:
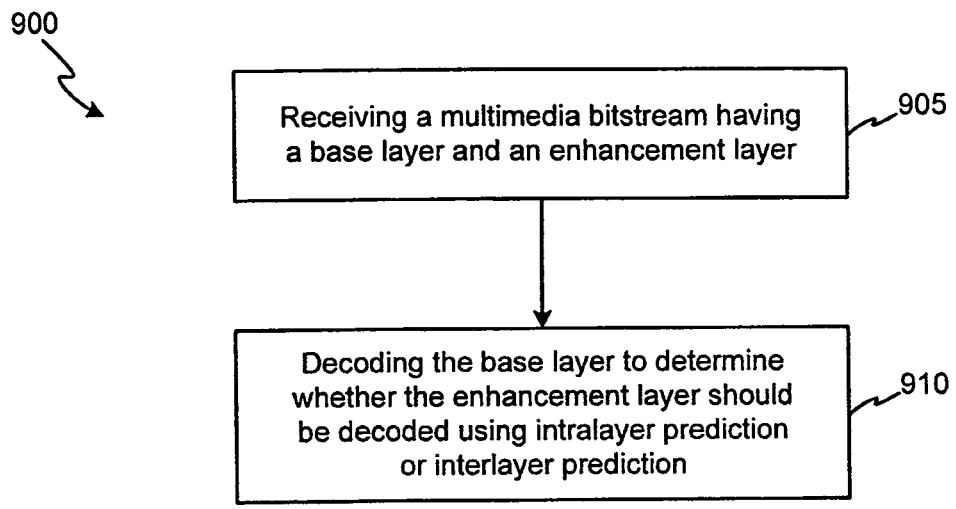
FIG. 9 is a flow chart of a method of decoding a multimedia bitstream using intralayer prediction or interlayer prediction.

FIG. 9 is a flow chart of a method 900 of decoding a multimedia bitstream using intralayer prediction or interlayer prediction. Processor 140 may receive a multimedia bitstream having a base layer and an enhancement layer (905). Decoder 150 may decode the base layer to determine whether the enhancement layer should be decoded using intralayer prediction or interlayer prediction (910). The base layer may include a plurality of base layer coefficients. In some embodiments, to determine whether the enhancement layer should be decoded using intralayer prediction or interlayer prediction, decoder 150 may determine whether the plurality of base layer coefficients include at least one non-zero coefficient. Decoder 150 may decode the base layer using intralayer prediction if all the plurality of base layer coefficients have a zero value and may decode the base layer using interlayer prediction if at least one of the plurality of base layer coefficients has a non-zero value.

Figure 10:
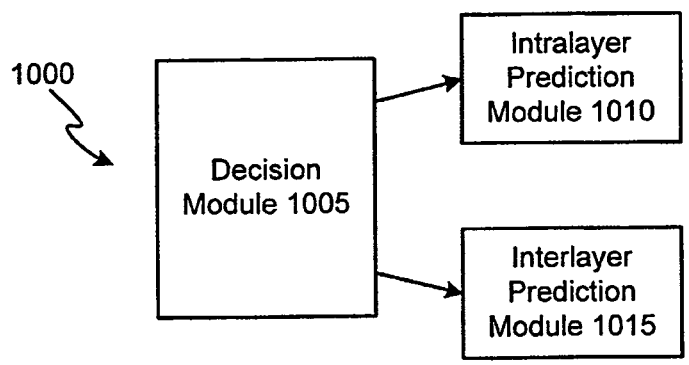
FIG. 10 is a block diagram of a decoder with intralayer prediction and interlayer prediction.

FIG. 10 is a block diagram of a decoder 1000 with intralayer prediction and interlayer prediction. Decoder 1000 may be part of processor 140 and/or decoder 150 and may be used to implement the method of FIG. 9. Decoder 1000 may be implemented by hardware, software, firmware, middleware, microcode, or any combination thereof. Decoder 1000 may include a decision module 1005, an intralayer prediction module 1010 and an interlayer prediction module 1015. Decision module 1005 may receive a multimedia bitstream having a base layer and an enhancement layer and may decode the base layer to determine whether the enhancement layer should be decoded using intralayer prediction or interlayer prediction. Intralayer prediction module 1010 may be used to decode the enhancement layer using intralayer prediction. Interlayer prediction module 1015 may be used to decode the enhancement layer using interlayer prediction.

In some embodiments of the invention, an apparatus for processing multimedia data being associated with multiple layers is disclosed. The apparatus may include means for determining a base layer residual. The means for determining a base layer residual may be processor 120, encoder 130, base layer encoding module 300, enhancement layer encoding module 305, prediction modules 370 and 375, motion estimation module 405, decision module 410 and/or base layer encoding module 505. The apparatus may include means for performing interlayer prediction to generate an enhancement layer residual if at least one of a number of non-zero coefficients of the base layer residual or a number of zero coefficients of the base layer residual meets a first selected condition. The means for performing interlayer prediction may be processor 120, encoder 130, base layer encoding module 300, enhancement layer encoding module 305, prediction modules 370 and 375, base layer encoding module 505 and/or interlayer prediction module 520. The apparatus may include means for performing temporal prediction to generate the enhancement layer residual if at least one of a number of non-zero coefficients of the base layer residual or a number of zero coefficients of the base layer residual meets a second selected condition. The means for performing temporal prediction may be processor 120, encoder 130, base layer encoding module 300, enhancement layer encoding module 305, prediction modules 370 and 375, base layer encoding module 505 and/or temporal prediction module 525.

In some embodiments of the invention, an apparatus for decoding a multimedia bitstream is disclosed. The apparatus may include means for receiving a multimedia bitstream having a base layer and an enhancement layer. The means for receiving a multimedia bitstream may be processor 140, decoder 150 and/or decision module 1005. The apparatus may include means for decoding the base layer to determine whether the enhancement layer should be decoded using intralayer prediction or interlayer prediction. The means for decoding may be processor 140, decoder 150, decision module 1005, intralayer prediction module 1010 and/or interlayer prediction module 1015.

Those of ordinary skill would appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of processing multimedia data being associated with multiple layers comprising:
   determining a base layer residual by a computer device; and
   performing interlayer prediction by the computer device to generate an enhancement layer residual if a count of non-zero coefficients of the base layer residual meets a first selected condition, wherein the first selected condition is only met if all coefficients of the base layer residual are non-zero coefficients, and further wherein the computer device performing interlayer prediction includes the computer device:
      determining a coefficient of a base layer reconstructed block based on a coefficient of a base layer reference block and a coefficient of the base layer residual; and
      determining a coefficient of an enhancement layer reconstructed block by using the coefficient of the base layer reconstructed block.

2. The method of claim 1 wherein the first selected condition is further met if the count is greater than or equal to a threshold.

3. The method of claim 1 further comprising performing temporal prediction to generate the enhancement layer residual if at least one of a number of non-zero coefficients of the base layer residual or a number of zero coefficients of the base layer residual meets a second selected condition.

4. The method of claim 3 wherein the second selected condition is met if the number of non-zero coefficients of the base layer residual is less than or equal to a threshold.

5. The method of claim 3 wherein the second selected condition is met if the number of zero coefficients of the base layer residual is greater than or equal to a threshold.

6. The method of claim 3 wherein performing temporal prediction includes:
   assigning a plurality of non-zero coefficients of the base layer residual to zero; and
   determining a coefficient of an enhancement layer reconstructed block based on a coefficient of an enhancement layer reference block and a coefficient of an enhancement layer residual.

7. The method of claim 1 further comprising setting a code to indicate that the enhancement layer residual should not be transmitted.

8. A processor for processing multimedia data being associated with multiple layers, the processor being configured to:
   determine a base layer residual; and
   perform interlayer prediction to generate an enhancement layer residual if a count of non-zero coefficients of the base layer residual meets a first selected condition, wherein the first selected condition is only met if all coefficients of the base layer residual are non-zero coefficients, and further wherein to perform interlayer prediction includes:
      determine a coefficient of a base layer reconstructed block based on a coefficient of a base layer reference block and a coefficient of the base layer residual; and
      determine a coefficient of an enhancement layer reconstructed block by using the coefficient of the base layer reconstructed block.

9. The processor of claim 8 wherein the first selected condition is further met if the count is greater than or equal to a threshold.

10. The processor of claim 8 further configured to perform temporal prediction to generate the enhancement layer residual if at least one of a number of non-zero coefficients of the base layer residual or a number of zero coefficients of the base layer residual meets a second selected condition.

11. The processor of claim 10 wherein the second selected condition is met if the number of non-zero coefficients of the base layer residual is less than or equal to a threshold.

12. The processor of claim 10 wherein the second selected condition is met if the number of zero coefficients of the base layer residual is greater than or equal to a threshold.

13. The processor of claim 10 wherein to perform temporal prediction includes:
   assign a plurality of non-zero coefficients of the base layer residual to zero; and
   determine a coefficient of an enhancement layer reconstructed block based on a coefficient of an enhancement layer reference block and a coefficient of an enhancement layer residual.

14. The processor of claim 8 further configured to set a code to indicate that the enhancement layer residual should not be transmitted.

15. An apparatus for processing multimedia data being associated with multiple layers comprising:
   a motion estimation module for determining a base layer residual; and
   an interlayer prediction module for performing interlayer prediction to generate an enhancement layer residual if a count of non-zero coefficients of the base layer residual meets a first selected condition, wherein the first selected condition is only met if all coefficients of the base layer residual are non-zero coefficients, and
   further wherein the interlayer prediction module:
      determines a coefficient of a base layer reconstructed block based on a coefficient of a base layer reference block and a coefficient of the base layer residual; and
      determines a coefficient of an enhancement layer reconstructed block by using the coefficient of the base layer reconstructed block.

16. The apparatus of claim 15 wherein the first selected condition is further met if the count is greater than or equal to a threshold.

17. The apparatus of claim 15 further comprising a temporal prediction module for performing temporal prediction to generate the enhancement layer residual if at least one of a number of non-zero coefficients of the base layer residual or a number of zero coefficients of the base layer residual meets a second selected condition.

18. The apparatus of claim 17 wherein the second selected condition is met if the number of non-zero coefficients of the base layer residual is less than or equal to a threshold.

19. The apparatus of claim 17 wherein the second selected condition is met if the number of zero coefficients of the base layer residual is greater than or equal to a threshold.

20. The apparatus of claim 17 wherein the temporal prediction module:
   assigns a plurality of non-zero coefficients of the base layer residual to zero; and determines a coefficient of an enhancement layer reconstructed block based on a coefficient of an enhancement layer reference block and a coefficient of an enhancement layer residual.

21. The apparatus of claim 15 further comprising a decision module to set a code to indicate that the enhancement layer residual should not be transmitted.

22. An apparatus for processing multimedia data being associated with multiple layers comprising:
 means for determining a base layer residual; and
 means for performing interlayer prediction to generate an enhancement layer residual if a count of non-zero coefficients of the base layer residual meets a first selected condition, wherein the first selected condition is only met if all coefficients of the base layer residual are non-zero coefficients, and
 further wherein the means for performing interlayer prediction includes:
  determining a coefficient of a base layer reconstructed block based on a coefficient of a base layer reference block and a coefficient of the base layer residual; and
  determining a coefficient of an enhancement layer reconstructed block by using the coefficient of the base layer reconstructed block.

23. The apparatus of claim 22 wherein the first selected condition is further met if the count is greater than or equal to a threshold.

24. The apparatus of claim 22 further comprising means for performing temporal prediction to generate the enhancement layer residual if at least one of a number of non-zero coefficients of the base layer residual or a number of zero coefficients of the base layer residual meets a second selected condition.

25. The apparatus of claim 24 wherein the second selected condition is met if the number of non-zero coefficients of the base layer residual is less than or equal to a threshold.

26. The apparatus of claim 24 wherein the second selected condition is met if the number of zero coefficients of the base layer residual is greater than or equal to a threshold.

27. The apparatus of claim 24 wherein the means for performing temporal prediction includes:
 assigning a plurality of non-zero coefficients of the base layer residual to zero; and
 determining a coefficient of an enhancement layer reconstructed block based on a coefficient of an enhancement layer reference block and a coefficient of an enhancement layer residual.

28. The apparatus of claim 22 further comprising means for setting a code to indicate that the enhancement layer residual should not be transmitted.

29. A non-transitory computer-readable storage medium storing instructions for causing a computer to process multimedia data associated with multiple layers, comprising:
 instructions for causing a computer to determine a base layer residual; and
 instructions for causing a computer to perform interlayer prediction to generate an enhancement layer residual if a count of non-zero coefficients of the base layer residual meets a first selected condition, wherein the first selected condition is only met if all coefficients of the base layer residual are non-zero coefficients, and
 further wherein the instructions for causing a computer to perform interlayer prediction further comprise:
  instructions for causing a computer to determine a coefficient of a base layer reconstructed block based on a coefficient of a base layer reference block and a coefficient of the base layer residual; and
  instructions for causing a computer to determine a coefficient of an enhancement layer reconstructed block by using the coefficient of the base layer reconstructed block.

30. The non-transitory computer-readable storage medium of claim 29 wherein the first selected condition is further met if the count is greater than or equal to a threshold.

31. The non-transitory computer-readable storage medium of claim 29 further comprising instructions for causing a computer to perform temporal prediction to generate the enhancement layer residual if at least one of a number of non-zero coefficients of the base layer residual or a number of zero coefficients of the base layer residual meets a second selected condition.

32. The non-transitory computer-readable storage medium of claim 31 wherein the second selected condition is met if the number of non-zero coefficients of the base layer residual is less than or equal to a threshold.

33. The non-transitory computer-readable storage medium of claim 31 wherein the second selected condition is met if the number of zero coefficients of the base layer residual is greater than or equal to a threshold.

34. The non-transitory computer-readable storage medium of claim 31 further comprising:
 instructions for causing a computer to assign a plurality of non-zero coefficients of the base layer residual to zero; and
 instructions for causing a computer to determine a coefficient of an enhancement layer reconstructed block based on a coefficient of an enhancement layer reference block and a coefficient of an enhancement layer residual.

35. The non-transitory computer-readable storage medium of claim 29 further comprising instructions for causing a computer to set a code to indicate that the enhancement layer residual should not be transmitted.

* * * * *